(12) United States Patent
Katzer et al.

(10) Patent No.: US 7,710,824 B1
(45) Date of Patent: May 4, 2010

(54) LOCATION MONITORING AND SONAR DETERMINATION OF PRESENCE

(75) Inventors: Robin Dale Katzer, Olathe, KS (US); Lynn Neir, Overland Park, KS (US); Charles D. Stunson, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 232 days.

(21) Appl. No.: 11/857,033

(22) Filed: Sep. 18, 2007

(51) Int. Cl.
*G01S 3/801* (2006.01)
(52) U.S. Cl. ..................................... 367/99
(58) Field of Classification Search .................. 367/99, 367/95, 97, 128, 93
See application file for complete search history.

(56) References Cited

U.S. PATENT DOCUMENTS

| | | | | |
|---|---|---|---|---|
| 4,189,719 A | * | 2/1980 | Massa et al. | 367/93 |
| 4,229,811 A | * | 10/1980 | Salem | 367/93 |
| 4,242,743 A | * | 12/1980 | Salem | 367/93 |
| 4,512,000 A | * | 4/1985 | Masuko | 367/93 |
| 4,815,046 A | * | 3/1989 | Dorr | 367/93 |
| 4,875,198 A | * | 10/1989 | Ariav | 367/93 |
| 4,939,701 A | * | 7/1990 | Brunner et al. | 367/128 |
| 7,049,960 B2 | * | 5/2006 | Waltermann | 367/93 |
| 2005/0225427 A1 | * | 10/2005 | Bell et al. | 340/5.2 |

OTHER PUBLICATIONS

Katzer, Robin Dale, et al., "Rules and Events Processing Engine and Method," U.S. Appl. No. 11/857,021, filed Sep. 18, 2007.

* cited by examiner

*Primary Examiner*—Dan Pihulic

(57) ABSTRACT

A system is provided for location monitoring. The system includes an event sensor and a sonar sensor in communication with the event sensor. The event sensor detects an event at a location. The sonar sensor determines a presence at the location.

20 Claims, 5 Drawing Sheets

LOCATION MONITORING AND SONAR DETERMINATION OF PRESENCE

CROSS-REFERENCE TO RELATED APPLICATIONS

This application includes subject matter related to the following application, which is hereby incorporated by reference: U.S. patent application Ser. No. 11/857,021, filed Sep. 18, 2007, entitled "Rules and Events Processing Engine and Method," by Robin D. Katzer, et al.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Improvements in healthcare, diets, safety, and other considerations are permitting people to live longer. Elderly people often prefer to retain their autonomy and their freedom and continue to live in their own homes as long as possible, rather than moving, for example, to a nursing home. Societies everywhere are becoming increasingly mobile and dispersed. Children who formerly settled close to their birthplace now may settle several hundreds of miles away from their birthplace, far from their parent's residence. Additionally, both men and women often work outside the home. Children may feel nervous about their elderly parent continuing to live in their own homes rather than in a nursing home, being concerned that if a medical crisis strikes their elderly parent it may be a long time before the crisis becomes known.

SUMMARY

In some embodiments, a system is provided for location monitoring. The system includes an event sensor and a sonar sensor in communication with the event sensor. The event sensor detects an event at a location. The sonar sensor determines a presence at the location.

In other embodiments, a method is provided for monitoring a room. An event is detected with an event sensor at an entrance to the room. A depth of a penetration into the room is sensed with a sonar sensor, the sensing beginning with the onset of detecting the event. A room presence is determined based on sensing the depth of the penetration.

In still other embodiments, a method is provided for location monitoring. An event is detected at a location. A first acoustic signal is sensed at the location in response detecting the event at the location. A second acoustic signal is sensed at the location. The first acoustic signal is compared with the second acoustic signal to determine a presence at the location. A notification is sent of a determination of the presence at the location.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Elderly people may experience a health crisis during the night, for example a stroke, which prevents them from rising and moving about their residence in the morning. Additionally, elderly people may fall in their bathroom and be unable to get up. Some motion detection systems may not detect such problems. For example, if an elderly person rises in the morning, eats a snack left in their bedroom the night before, and then cleans their bedroom, sensors that detect motion through doorways may indicate that the person has not moved for hours. A monitoring system may not be able to detect whether a person who opened a bathroom door has entered the bathroom and stayed there for hours or if the person opened the bathroom door and then returned to their bed to take a nap.

The disclosure describes systems and methods that monitor multiple locations. Events that can be monitored at a location can include motion in a bedroom, opening a bedroom door, motion through the bedroom door, and other events. The systems include an event sensor and a sonar sensor in communication with the event sensor. After the event sensor detects an event at a location, the sonar sensor senses an initial acoustic signal and a later acoustic signal at the location to compare the acoustic signals. The comparison can determine a depth of a penetration into a room, which can be used to determine presence at the location. For example, after an event sensor detects an event at a bathroom door, the sonar sensor senses whether somebody actually enters the bathroom. The event sensor may also communicate with another sonar sensor that can sense that the person stayed in the bedroom after opening the bathroom door. The system can send messages regarding movement in the location to, for example, subscribers of the location monitoring system who may be children of elderly people living on their own. In other embodiments, however, the location monitoring system can monitor other kinds of locations, for example business facilities.

Figure 1:
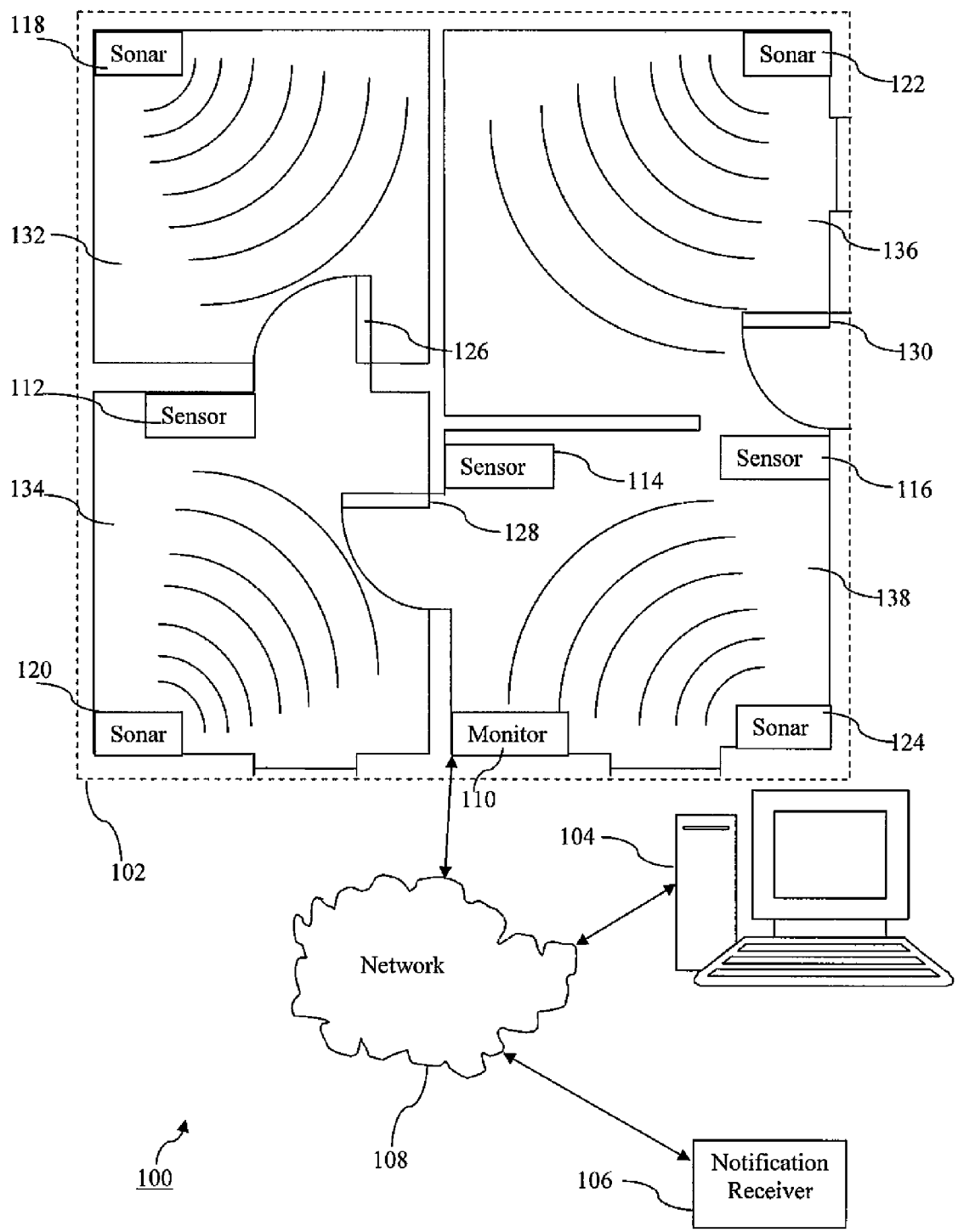
FIG. 1 is a block diagram of a location monitoring system according to some embodiments of the disclosure.

Turning now to FIG. 1, an embodiment of a location monitoring system 100 is shown. The location monitoring system 100 comprises a monitored location 102, a location monitoring server 104, and a notification receiver 106. While one monitored location 102 and one notification receiver 106 are depicted, it is to be understood that it is contemplated that the location monitoring system 100 may comprise a large number, for example several thousands or millions, of monitored locations 102 and notification receivers 106. The monitored location 102, the location monitoring server 104, and the notification receiver 106 communicate with one another through a network 108. In some embodiments the different monitored locations may be associated with different residences or buildings, while in other embodiments the different monitored locations may be distributed within a single large building, for example a manufacturing facility or an office building.

In some embodiments the monitored location 102 may be the private residence of an elderly person. The monitored location 102 includes a sensor monitor 110 that receives events from several sensors 112-116, for example event sensors, and several sonar sensors 118-124.

The sensors 112-116 may be motion sensors, vibration sensors, image sensors, sonar sensors, "electric eye" optical sensors, magnetic sensors, pressure sensors, contact switches, other electric sensors or switches, other electronic sensors or switches, other electromagnetic sensors, or other types of sensors. One or more of the sensors 112-116 may detect a chip or radio frequency identification tag carried by or embedded in the monitored entity or elderly person. The sensors 112-116 may detect the opening or a door or a window, for example the opening of a bathroom door 126, or the passage through an open doorway, such as a person entering the doorway of a bathroom with an opened bathroom door 126. For example, the sensor 112 detects an event at the bathroom door 126, the sensor 114 detects an event at a bedroom door 128, and the sensor 116 detects an event at a front door 130.

The sonar sensors 118-124 may detect motion in a location by sensing an initial acoustic signal at a location, sensing a second acoustic signal at the same location, and comparing the acoustic signals. Acoustic signals or waves may occur in various frequency ranges, both audible and inaudible to human hearing. Acoustic signals may be referred to as sounds, whether the acoustic signals occur in the audible frequency range or in the inaudible frequency range.

If the sonar sensors 118-124 utilize passive sonar techniques, the sensed acoustic signals may be sounds that occur at a location, for example sounds associated with vibrations of water pipes, vibrations of interior wall surfaces, vibrations of electrical appliances, and other vibrations. A passive sonar sensor, for example, may sense the initial acoustic signal emitted by vibrations of the water pipes in a bathroom with no person in the bathroom. The passive sonar sensor may sense the second acoustic signal when an elderly person is present in the bathroom, for example having just entered the bathroom. The second acoustic signal may be different from the initial acoustic signal received by the passive sonar sensor because the presence of the elderly person in the bathroom may change the propagation or dispersal of the sounds or acoustic waves caused by the vibrations of the water pipes in the bathroom, for example absorbing or dampening the sounds of the water pipes. The passive sonar sensor may compare the difference between the initial acoustic signal and the second acoustic signal to determine the presence of the elderly person in the bathroom based on the differences between the initial acoustic signal and the second acoustic signal.

If the sonar sensors 118-124 utilize active sonar techniques, the sonar sensors 118-124 may emit sounds at a location and the sensed acoustic signals may be echoes or reflections of the sounds emitted by the sonar sensors 118-124. An active sonar sensor may emit an acoustic signal or a sound, for example by generating a mechanical vibration, for a brief time, which may also be referred to as pulsing an acoustic signal. After pulsing an acoustic signal the active sonar sensor may wait to sense an echo of the pulsed acoustic signal. The active sonar sensor may repeatedly pulse the acoustic signal after intervals of listening or sensing echoes. The active sonar sensor may determine a distance of an object based on the time the pulsed acoustic signal takes to travel to the object and echo or reflect back to the active sonar sensor. The pulsed acoustic signal may be reflected by many objects that are normally positioned in a location, such as in a bathroom, including walls of the location. It will be readily appreciated by those skilled in the art that the active sonar sensor may be calibrated or tuned, either automatically or by configuration, to disregard or otherwise compensate for acoustic signal reflections from the walls or stationary objects in the location. After calibration, for example upon initialization of the active sonar sensor when powered on at the instance of the sensors 112-116 detecting motion, the active sonar sensor may determine a presence of a person at the location based on the reflection or echo of the acoustic pulse back from this person and/or based on the changes of the reflections or echoes of the acoustic pulse back from the walls or stationary objects of the location.

For example, as a person enters a room, the first echo created by the person is received by the sonar sensor 118 at a time that indicates that the person is at the entrance to the room, ten feet away from the sonar sensor 118. The second echo created by the person is received by the sonar sensor 118 at a time that indicates that the person is only seven feet away from the sonar sensor 118, which determines the person's presence is three feet into the room. In FIG. 1, the sonar sensor 118 senses acoustic signals in a bathroom 132, the sonar sensor 120 senses acoustic signals in a bedroom 134, the sonar sensor 122 senses acoustic signals in a kitchen 136, and the sonar sensor 124 senses acoustic signals in a living room 138. By coupling an event sensor with a sonar sensor, for example the sensors 112-116 with the sonar sensors 118-124, the monitoring system 100 may be able to discriminate actual entry of a person into a location from some other event that activates or triggers the event sensor. For example a person standing briefly in the doorway of the bathroom may trigger the event sensor but not actually enter the bathroom. By linking the event with a sonar sensor, such spurious events may be rejected or ignored by the monitoring system 100. If the event sensor coupled with the sonar sensor is a pressure sensor, the pressure sensor may detect the opening of the bathroom door 126, whereas if the event sensor is an electric eye optical sensor, the electric eye optical sensor may detect the breaking of an optical beam across the entry of the bathroom door 126.

Each of the sensors 112-116 may be coupled with at least one of the sonar sensors 118-124. For example, the sensor 112 that detects an event at the bathroom door 126 may activate the sonar sensor 118 in the bathroom 132 and the sonar sensor 120 in the bedroom 134. The sensor 112 may communicate with the sonar sensors 118-120 because the sonar sensors 118-120 sense acoustic signals at both sides of the bathroom door 126. Communicating with the sonar sensors 118-120 enables the location monitoring system 100 to determine whether a person remained in the bedroom 134 or entered the bathroom 132 after opening the bathroom door 126 that connects the bedroom 134 to the bathroom 132. In another example, the sensor 114 that detects an event at the bedroom door 128 may activate the sonar sensor 124 in the living room 138 and the sonar sensor 120 in the bedroom 134.

The sensor monitor 110 sends these detections of events and these senses of acoustic signals to the location monitoring server 104 via the network 108, for example using an email service where the subject line of the email message identifies an account number of a location monitoring system subscriber. The sensors 112-116 and the sonar sensors 118-124 may be placed appropriately throughout the monitored location 102 to determine that the resident, for example an elderly person, has risen in the morning and is generally moving about the monitored location 102 in an expected manner, for example traversing the bedroom 134, opening the bedroom door 128, and entering the living room 138. The monitored location 102 may include a mix of sensors 112-116 coupled to sonar sensors 118-124, as described above, as well as uncoupled sensors 112-116 that are not associated with any sonar sensor 118-124. For example, an event sensor coupled with a sonar sensor may cost more than an uncoupled event sensor. The event sensor coupled with the sonar sensor may be recommended for use to monitor locations that are projected to produce false notifications if an uncoupled event sensor is employed. In other locations where false notifications are not projected to occur often, cost savings may be realized by installing uncoupled event sensors. These are design choices that may be different for any specific location.

In some circumstances multiple sensors 112-116 may be placed in a single large room or at opposite ends of a long hallway. Yet other dispositions and arrangements of sensors may be provided in some embodiments. The sensors 112-116 may communicate with the sensor monitor 110 through wired or wireless communication links.

In some embodiments, multiple sensor monitors 110 may be distributed throughout a building, for example within a manufacturing building or within an office building, with each sensor monitor 110 in communication with a modest number of sensors 112-116 and sonar sensors 118-124. Alternatively, one or a small number of sensor monitors 110 may be distributed within a building with each sensor monitor 110 in communication with a large number of sensors 112-116 and sonar sensors 118-124. It will be understood that the numbers of sensor monitors 110, the numbers of sensors 112-116 linked to the sensor monitors 110, and the number of sonar sensors 118-124 linked to the sensor monitors 110 within a building is a design choice that depends upon individual installation circumstances and operational requirements. All of these structures are contemplated by the present disclosure.

The notification receiver 106 may be one or more general purpose computers, tablet computers, laptop computers, mobile phones, personal data assistants (PDAs), or other electronics communication device configured to receive notifications from the location monitoring server 104. General purpose computer systems, tablet computers, and laptop computers are discussed in greater detail hereinafter. Mobile phones and PDAs are discussed in greater detail hereinafter. In some embodiments, the location monitoring server 104 may send messages associated with the monitored location 102 to a plurality of notification receivers 106, for example to a computer of a first son, to a PDA of a second son, to a computer of a daughter, and to a mobile phone of a granddaughter of the monitored elderly person. The notifications may be sent by the location monitoring server 104 to the notification receiver 106 in a variety of formats including an email message, a simple message system (SMS) message, a text message, a pre-recorded voice message, a synthesized voice message, and other message formats.

The network 108 is any of a public switched telephone network (PSTN), a public data network, and/or a combination of these. The location monitoring server 104 may be implemented on any general purpose computer system that is configured to handle the processing load. General purpose computer systems are discussed in greater detail hereinafter.

Figure 2:
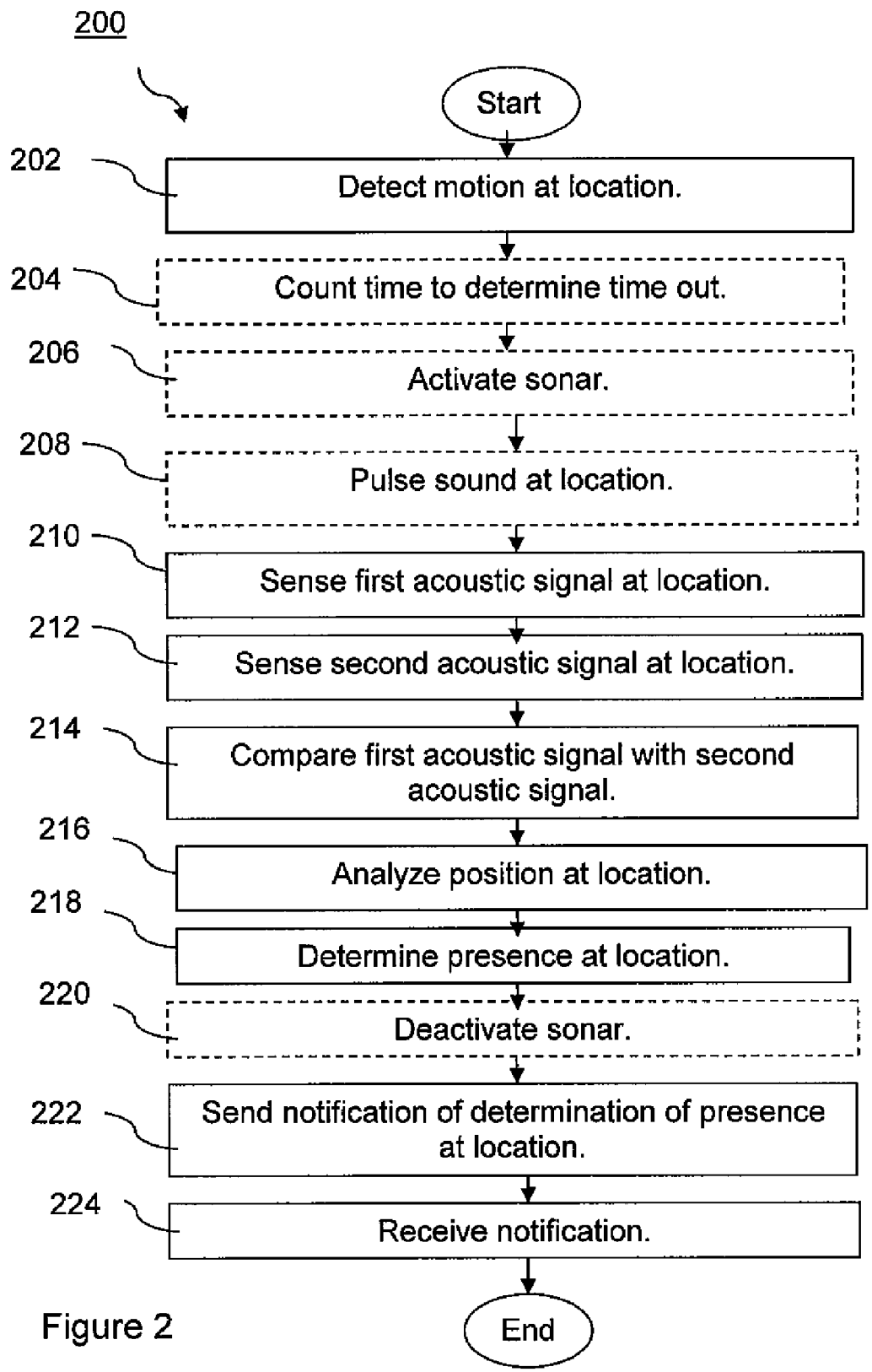
FIG. 2 is a flow diagram of a method according to some embodiments of the disclosure.

Turning now to FIG. 2, a method 200 is described that may be performed by at least some of the components of the location monitoring server 104. Embodiments of the present disclosure may execute the method to monitor a location using sonar determination of presence.

In box 202, an event is detected at a location. The event can be a door opening, a window opening, or a motion in the monitored location 102, such as a person walking into an open doorway. For example, the sensor 112 detects an event at the bathroom door 126.

In box 204, time is optionally counted to determine a time out. For example, a timer counts time from about when the event is detected, wherein the timer determines that time out has occurred and that the sonar sensor 118 in the bathroom 132 is to be deactivated. A time out interval may be configured for when the sonar sensor 118 is to be deactivated to conserve the battery strength or the energy consumption of the sonar sensor 118. The timer may also determine a time out for when the sonar sensor 120 in the bedroom 134 is deactivated. The location monitoring system 100 may use multiple sonar sensors 118-120 in conjunction with the sensor 112 associated with the bathroom door 126 to determine where a person went after they opened the bathroom door 126, into the bathroom 132 or back into the bedroom 134.

In box 206, sonar is activated. For example, the sensor 112 activates the sonar sensor 118 in the bathroom 132 in response to detecting the event at the bathroom door 126. The sensor 112 may also activate the sonar sensor 120 in the bedroom 134 in response to detecting the event at the bathroom door 126 because the bathroom door 126 connects the bathroom 132 to the bedroom 134.

In box 208, sounds are optionally pulsed at the location. For example, the sonar sensor 118 pulses a sound in the bathroom 132 in response to the sensor 112 detecting the event at the bathroom door 126. In contrast to passive sonar sensors, which sense acoustic signals in the environment, active sonar sensors pulse multiple sounds and sense acoustic signals that are echoes of the pulsed sounds. The sonar sensors 118-124 may be any combination of passive sonar sensors and active sonar sensors.

In box 210, a first acoustic signal is sensed at the location. For example, the sonar sensor 118 senses a first bathroom acoustic signal in the bathroom 132. If the sonar sensor 118 is an active sonar sensor, the first bathroom acoustic signal may be a first echo of a first sound pulsed by the sonar sensor 118. The sonar sensor 120 may also sense a first bedroom acoustic signal in the bedroom 134.

In box 212, a second acoustic signal is sensed at the location. For example, the sonar sensor 118 senses a second bathroom acoustic signal in the bathroom 132. If the sonar sensor 118 is an active sonar sensor, the second bathroom acoustic signal may be a second echo of a second sound pulsed by the sonar sensor 118. The sonar sensor 120 may also sense a second bedroom acoustic signal in the bedroom 134.

In box 214, the first acoustic signal is compared with the second acoustic signal. For example, the sonar sensor 118 compares the first bathroom acoustic signal with the second bathroom acoustic signal, which may be echoes of sounds pulsed by the sonar sensor 118. The comparison may result in determining an approximate position of the presence, such as grandma's position is sensed three and a half feet into the bathroom 132. The sonar sensor 120 may also compare its own bedroom acoustic signals to determine that grandma's position is no longer sensed in the bedroom 134. In some embodiments, a baseline acoustic signal may be captured or stored initially and potentially periodically. For example, the baseline acoustic signal may be taken once each day or after the most recent confirmed departure from the bedroom 134. The baseline acoustic signal may be used for comparison with acoustic signals received after activation by the event sensor.

In box 216, a position is analyzed at the location. For example, the sonar sensor 118 analyzes the sensed position as the fourth level of penetration into the bathroom 132. Sonar sensors may sense multiple distinct levels of proximity, with each level indicating a different position in a location, such as three and a half feet corresponding to the fourth of eleven levels sensed by the sonar sensor 118. Additionally, the sensor monitor 110 may analyze the sensed position as a percentage penetration of 35%, with the position penetrating three and a half feet into the bathroom 132 where the maximum penetration sensed by the sonar sensor 118 is ten feet.

In box 218, presence is determined at the location. For example, the sonar sensor 118 determines presence in the bathroom 132 based on sensing the depth of the penetration into the bathroom 132. The sonar sensor 118 may determine that any sensed position corresponding to levels four to eleven indicates presence in the bathroom 132. Alternatively, the sensor monitor 110 may determine that any sensed position corresponding to more than 20% of the maximum penetration into the bathroom 132 indicates presence in the bathroom. Sensed positions that do not indicate presence may indicate that a person was in a doorway to a room but did not fully enter the room.

In box 220, the sonar is optionally deactivated. For example, the sonar sensor 118 may deactivate after the timer counts the time out from when the sensor 112 detected the event at the bathroom door 126. Alternatively, the sensor 112 may deactivate the sonar sensor 118 after the timer counts the time out from when the sensor 112 detected the event at the bathroom door 126. The time out interval may be adjusted to permit more than sufficient time for the sonar sensor 118 to sense, compare, and analyze acoustic signals in the bathroom 132 for any subsequent movement required by a set of rules for sending notifications. The location monitoring system 100 may count the time out and deactivate the sonar sensor 118 to conserve the battery strength or the energy consumption of the sonar sensor 118.

In box 222, notification is sent of a determination of presence at the location. For example, the sensor monitor 110 sends a notification that determines grandma's presence to be in the bathroom 132. The sensor monitor 110 may also send a notification that determines grandma's presence not to be in the bedroom 134. The system 100 can use a set of rules to determine when to send a notification and the content of the notification. The notification may specify an identification of the location, whether the presence occurs within an expected time interval based on the rules, an identification of the rule(s) that invoked the sending of the notification, and a message content of the notification.

The rules may include both static rules and dynamic rules. As an example to illustrate a set of static rules, a daughter may wish to confirm that her elderly mother follows a routine each morning. The first static rule defines rising from bed and leaving the bedroom 134 between 7 AM and 8 AM, as evidenced by motion sensed by the sonar sensor 120 in the bedroom 134 and an event detected by either the sensor 112 for the bathroom doorway or the sensor 114 for the bedroom doorway. The second static rule defines entering and moving about the living room 138 between 7:30 AM and 9 AM, as evidenced by an event detected by the sensor 114 for the bedroom doorway that leads to the living room 138 and the sonar sensor 124 for the living room 138. The third static rule defines entering the kitchen 136 and opening a refrigerator between 9 AM and 10 AM, as evidenced by a sensor associated with the refrigerator door and the sonar sensor 122 for the kitchen 136. When the three events monitored by the three static rules complete successfully, the location monitoring system 100 may send the notification message "mother is up and about and has accessed the refrigerator this morning" to the daughters notification receiver 106. If the location monitoring system 100 does not detect an event or determine presence at a location prior to 10 AM, the location monitoring system 100 sends the notification message, for example "mother has not risen from bed this morning," to the daughter's notification receiver 106.

In contrast, a dynamic rule may be triggered by a specific event, for example by grandma entering the bathroom 132. Time limits associated with dynamic rules are linked to a time of the trigger event associated with the dynamic rule. For example, if a first dynamic rule is linked to the trigger of an event detected by the sensor 112 for the bathroom door 126 and determination of grandma's presence in the bathroom 132 at 2:33 PM by the sonar sensor 118 in the bathroom 132, time limits associated with the first dynamic rule are relative to 2:33 PM. For example, a dynamic bathroom motion rule may include a duration of 30 minutes, a step message start time of 15 minutes, and a step interval of 5 minutes. In this exemplary case, if the sonar sensor 118 in the bathroom 132 does not determine a new position within 15 minutes after the trigger event, for example by 2:48 PM, the location monitoring system 100 sends a first step notification message to the notification receiver 106. The step notification message may be "grandma has entered and remains in the bathroom." As long as the sonar sensor 118 in the bathroom 132 does not determine a new position, this step notification message is repeatedly sent at the time intervals defined by the step interval, for example every 5 minutes at 2:53 PM and 2:58 PM. If the sonar sensor 118 in the bathroom 132 does not determine a new position within the duration, for example 30 minutes after 2:33 PM or 3:03 PM, the location monitoring system 100 sends a notification message to the notification receiver 106, for example "grandma has entered the bathroom and has not changed her position for an excessive time duration."

In box 224, a notification is received. For example, the granddaughter's notification receiver 106, such as a mobile phone, receives a "grandma has entered the bathroom and has not changed her position for an excessive time duration" notification message. In some embodiments, analysis of acoustic signals or a combination of acoustic signals from multiple sonar devices may be able to provide a general indication of whether a person in a room is standing, sitting, or prone on the floor. A static rule could be provided to automatically send notification if grandma is prone on the floor of the bathroom 132. A dynamic rule could call for an additional notification if she remains prone for more than one minute or some other similar small time period. Other similar rules readily suggest themselves, all of which are contemplated by the present disclosure.

Figure 3:
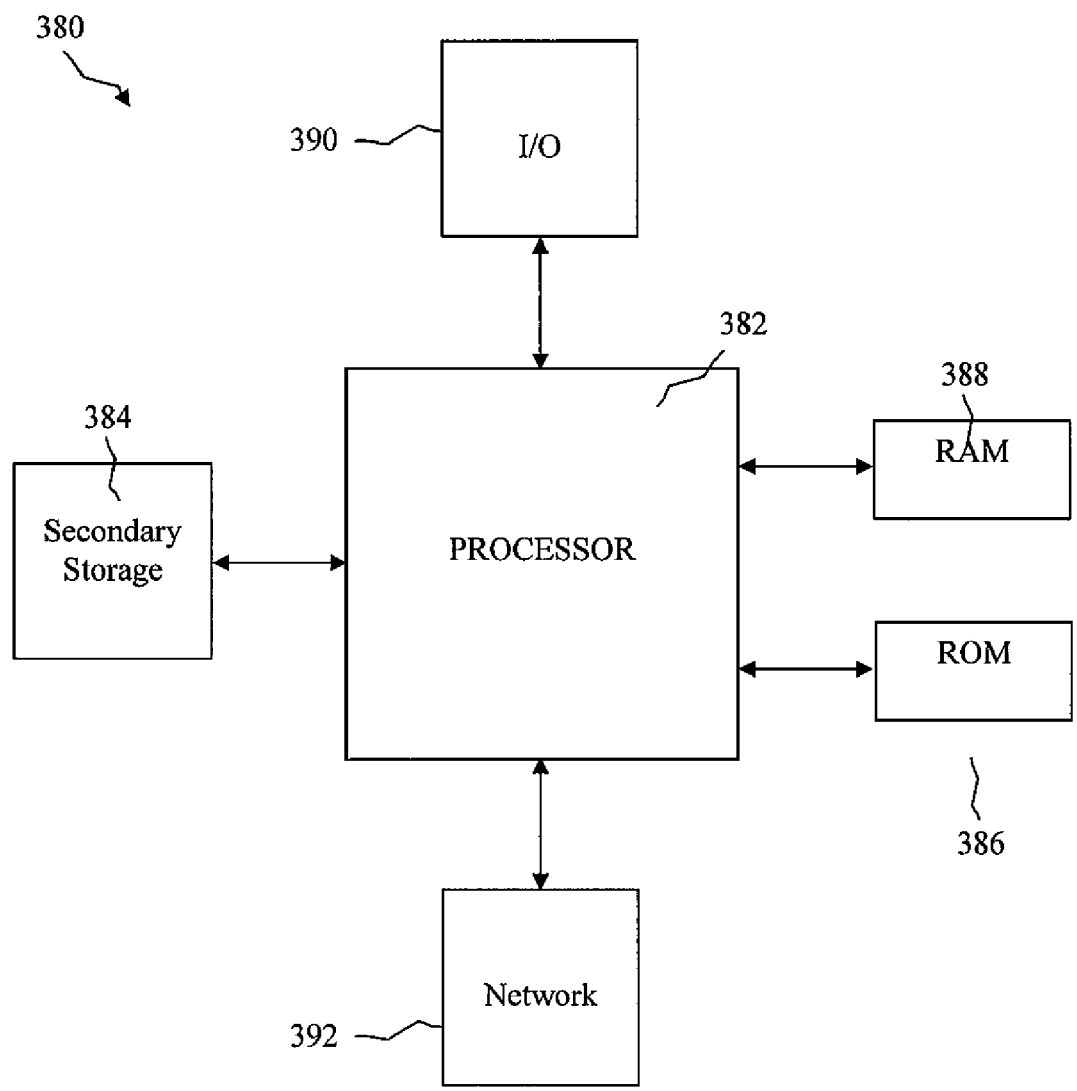
FIG. 3 illustrates an exemplary general purpose computer system suitable for implementing the several embodiments of the disclosure.

Portions of the location monitoring system 100 described above may be implemented on any general-purpose computer with sufficient processing power, memory resources, and network throughput capability to handle the necessary workload placed upon it. For example, in some embodiments the location monitoring server 104 and the sensor monitor 110 may be general-purpose computers. In some embodiments, the notification receiver 106 may be a general-purpose computer, a tablet computer, a laptop computer, or it may be a mobile device such as a mobile phone or PDA. FIG. 3 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 392 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 392 may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

Figure 4:
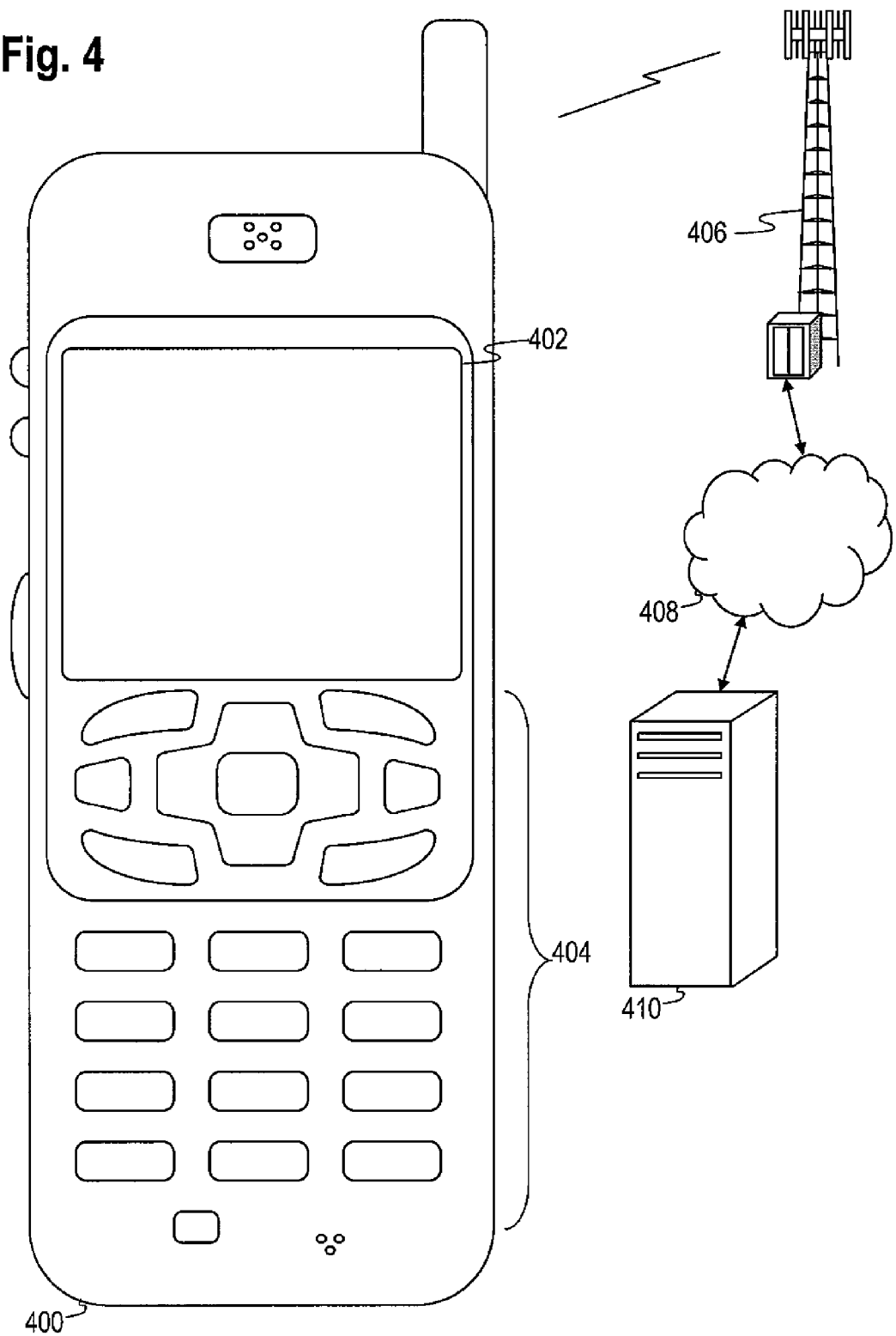
FIG. 4 is an illustration of a mobile device according to some embodiments of the disclosure.

FIG. 4 shows a wireless communications system including a handset 400, which may be the notification receiver 106. FIG. 4 depicts the handset 400, which is operable for implementing aspects of the present disclosure, but the present disclosure should not be limited to these implementations. In an embodiment, for example, the notification receiver 106 may be implemented as the handset 400. Though illustrated as a mobile phone, the handset 400 may take various forms including a wireless handset, a pager, a personal digital assistant (PDA), a portable computer, a tablet computer, or a laptop computer. Many suitable handsets combine some or all of these functions. In some embodiments of the present disclosure, the handset 400 is not a general purpose computing device like a portable, laptop or tablet computer, but rather is a special-purpose communications device such as a mobile phone, wireless handset, pager, or PDA. The handset 400 may support specialized work assignments such as inventory control, job control, and/or task management functions.

The handset 400 includes a display 402 and a touch-sensitive surface or keys 404 for input by a user. The handset 400 may present options for the user to select, controls for the user to actuate, and/or cursors or other indicators for the user to direct. The handset 400 may further accept data entry from the user, including numbers to dial or various parameter values for configuring the operation of the handset. The handset 400 may further execute one or more software or firmware applications in response to user commands. These applications may configure the handset 400 to perform various customized functions in response to user interaction. Additionally, the handset 400 may be programmed and/or configured over-the-air, for example from a wireless base station, a wireless access point, or a peer handset 400.

The handset 400 may execute a web browser application which enables the display 402 to show a web page. The web page may be obtained via wireless communications with a cell tower 406, a wireless network access node, a peer handset 400 or any other wireless communication network or system. The cell tower 406 (or wireless network access node) is coupled to a wired network 408, such as the Internet. Via the wireless link and the wired network, the handset 400 has access to information on various servers, such as a server 410. The server 410 may provide content that may be shown on the display 402. Alternately, the handset 400 may access the cell tower 406 through a peer handset 400 acting as an intermediary, in a relay type or hop type of connection.

Figure 5:
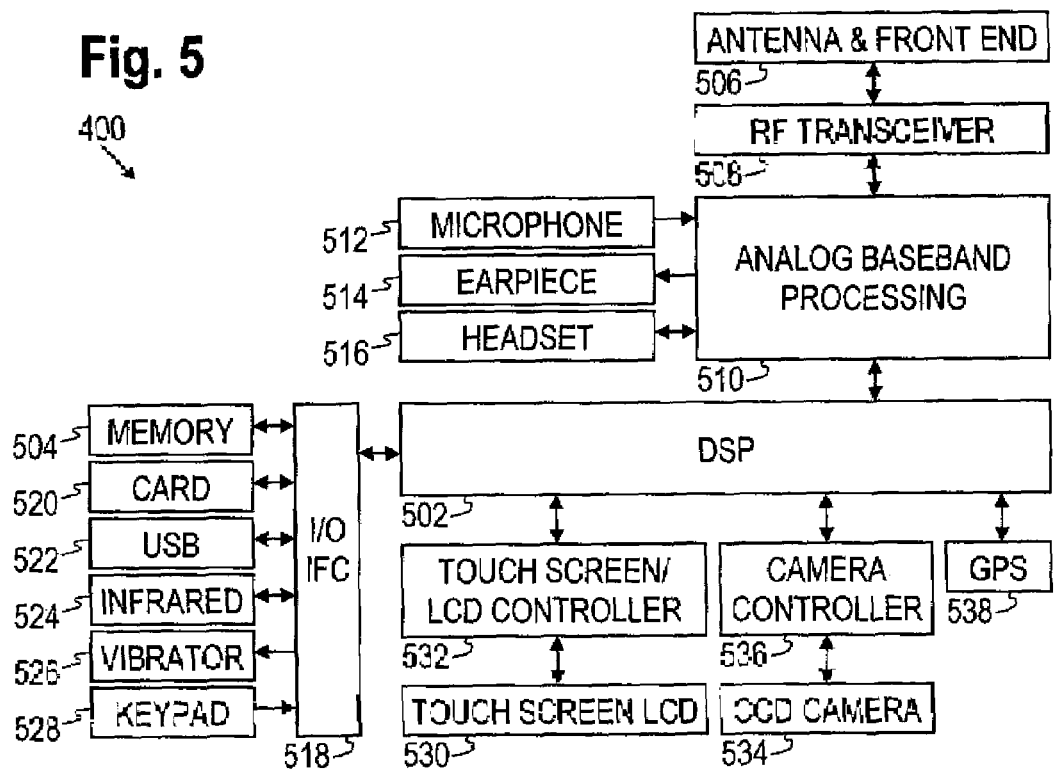
FIG. 5 is a block diagram of a mobile device according to some embodiments of the disclosure.

FIG. 5 shows a block diagram of the handset 400. While a variety of known components of handsets 400 are depicted, in an embodiment a subset of the listed components and/or additional components not listed may be included in the handset 400. The handset 400 includes a digital signal processor (DSP) 502 and a memory 504. As shown, the handset 400 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In some embodiments, the handset 400 may include another kind of display that does not provide a touch sensitive screen. In some embodiments, the DSP 502 may communicate directly with the memory 504 without passing through the input/output interface 518.

The DSP 502 or some other form of controller or central processing unit operates to control the various components of the handset 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the handset 400 to send and receive information from a cellular network or some other available wireless communications network or from a peer handset 400. In some embodiments, the antenna and front end unit 506 may include multiple antennas whereby to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. For the purposes of clarity the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the handset 400 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast fourier transforming (IFFT)/fast fourier transforming (FFT), cyclic prefix appending/removal, and other signal processing functions associated with wireless communications. In some embodiments, for example in a code division multiple access (CDMA) technology application, for a transmitter function the DSP 502 may perform modulation, coding, interleaving, and spreading and for a receiver function the DSP 502 may perform despreading, deinterleaving, decoding, and demodulation. In some other embodiments, for example in an orthogonal frequency division multiplex access (OFDMA) technology application, for the transmitter function, the DSP 502 may perform modulation, coding, interleaving, inverse fast fourier transforming, and cyclic prefix appending and for a receiver function, the DSP 502 may perform cyclic prefix removal, fast fourier transforming, deinterleaving, decoding, and demodulation. In other wireless technology applications yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the handset 400 to function as a peripheral device to exchange information with a personal computer or other computer system. The infrared port 524 and other optional ports such as a Bluetooth interface or an IEEE 802.11 compliant wireless interface may enable the handset 400 to communicate wirelessly with other nearby handsets and/or wireless base stations.

The input/output interface 518 may further connect the DSP 502 to the vibrator 526 that, when triggered, causes the handset 400 to vibrate. The vibrator 526 may serve as a mechanism for silently alerting the user to any of various events such as an incoming call, a new text message, and an appointment reminder.

The keypad 528 couples to the DSP 502 via the input/output interface 518 to provide one mechanism for the user to make selections, enter information, and otherwise provide input to the handset 400. Another input mechanism may be the touch screen LCD 530, which may also display text and/or graphics to the user. The touch screen LCD controller 532 couples the DSP 502 to the touch screen LCD 530.

The CCD camera 534 enables the handset 400 to take digital pictures. The DSP 502 communicates with the CCD camera 534 via the camera controller 536. The GPS sensor 538 is coupled to the DSP 502 to decode global positioning system signals, thereby enabling the handset 400 to determine its position. In another embodiment, a camera operating according to a technology different from Charge Coupled Device cameras may be employed. Various other peripherals may also be included to provide additional functions, e.g., radio and television reception.

Figure 6:
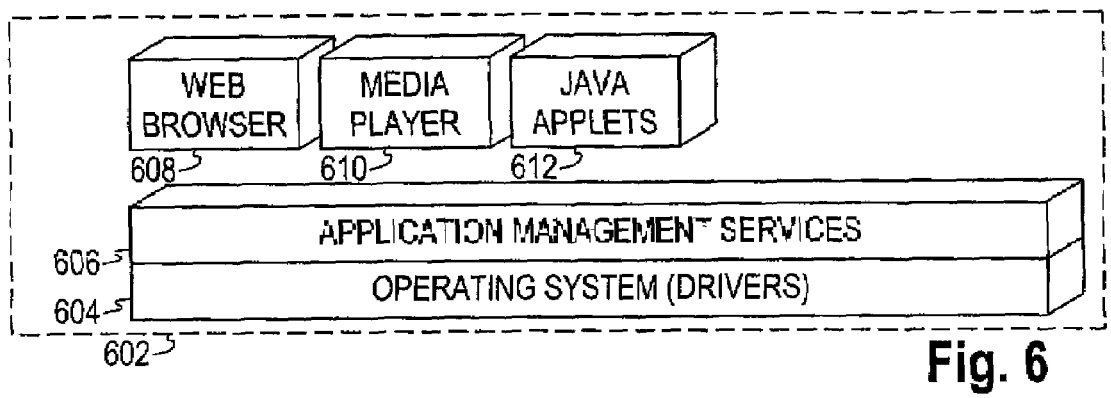
FIG. 6 is a block diagram of a software configuration for a mobile device according to some embodiments of the disclosure.

FIG. 6 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the handset 400. Also shown in FIG. 6 are a web browser application 608, a media player application 610, and JAVA applets 612. The web browser application 608 configures the handset 400 to operate as a web browser, allowing a user to enter information into forms and select links to retrieve and view web pages. The media player application 610 configures the handset 400 to retrieve and play audio or audiovisual media. The JAVA applets 612 configure the handset 400 to provide games, utilities, and other functionality.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A system for location monitoring, comprising:
an event sensor; and
an acoustic sonar sensor in communication with the event sensor, wherein the event sensor detects an event at a location, and the sonar sensor determines a presence of an object at the location in response to receiving a reflected acoustic signal.

2. The system of claim 1, wherein the event sensor is further configured to activate the sonar sensor in response to detecting the event.

3. The system of claim 1, wherein the sonar sensor is further configured to deactivate after determining the presence at the location.

4. The system of claim 1, wherein the event sensor is further configured to deactivate the sonar sensor after the sonar sensor determines the presence at the location.

5. The system of claim 1, further comprising a timer to count time from about when the event is detected, wherein the timer determines a time out for when the sonar sensor is deactivated.

6. The system of claim 1, wherein the event sensor is at least one of a motion sensor, a vibration sensor, an image sensor, a sonar sensor, an electric eye optical sensor, a magnetic sensor, a contact switch, and a pressure sensor, wherein the event indicates one of a motion in the location, a door opening, and a window opening.

7. The system of claim 1, wherein the sonar sensor is further configured to determine a position of the presence at the location.

8. A method of monitoring a room, comprising:
detecting an event with an event sensor at an entrance to the room;
sensing a depth of a penetration into the room with a sonar sensor, the sensing beginning with the onset of detecting the event; and
determining a room presence based on sensing the depth of the penetration.

9. The method of claim 8, further comprising sensing an initial acoustic signal with the sonar sensor at the onset of detecting the event, and wherein the sensing the depth of the penetration is based on comparing the initial acoustic signal to a later acoustic signal.

10. The method of claim 8, further comprising:
activating the sonar sensor at the onset of detecting the event; and
deactivating the sonar sensor after a time out.

11. A method for location monitoring, comprising:
detecting an event at a first location;
sensing a first acoustic signal at the first location in response to detecting the event at the first location;
sensing a second acoustic signal at the first location;
comparing the first acoustic signal with the second acoustic signal to determine a presence at the first location;
sending a notification of a determination of the presence at the first location;
wherein the first acoustic signal and the second acoustic signal are echoes.

12. The method of claim 11, further comprising:
pulsing sounds at the first location in response to the detecting the event at the first location.

13. The method of claim 11, wherein comparing the first acoustic signal with the second acoustic signal determines an approximate position of the presence.

14. The method of claim 13, further comprising analyzing the position at the first location to determine the presence at the first location.

15. The method of claim 11, further comprising:
sensing a third acoustic signal at a second location in response to the detecting the event at the first location;
sensing a fourth acoustic signal at the second location;
comparing the third acoustic signal with the fourth acoustic signal to determine a presence at the second location;
sending a notification of a determination of the presence at the second location.

16. The method of claim 11, further comprising:
activating a first sonar sensor and a second sonar sensor in response to the detecting the event at the first location; and
deactivating the first sonar sensor and the second sonar sensor after a time out.

17. A method for location monitoring, comprising:
detecting an event at a first location;
sensing a first acoustic signal at the first location in response to detecting the event at the first location;
sensing a second acoustic signal at the first location;
comparing the first acoustic signal with the second acoustic signal to determine a presence at the first location;
sending a notification of a determination of the presence at the first location,
wherein the notification specifies whether the presence occurs within an expected time interval based on at least one of a static rule and a dynamic rule.

18. The method of claim 17, wherein the notification includes an identification of the first location, an identification of at least one of the static rule and the dynamic rule, and a message content of the notification.

19. The method of claim 11, further comprising receiving the notification of the determination on a mobile device.

20. The method of claim 19, wherein the mobile device is one of a mobile phone, a wireless handset, a pager, a personal digital assistant, a portable computer, a tablet computer, and a laptop computer.

* * * * *